July 15, 1947.  F. W. SCHWINN  2,424,195
CARRIER ATTACHMENT
Filed April 19, 1945  2 Sheets-Sheet 1
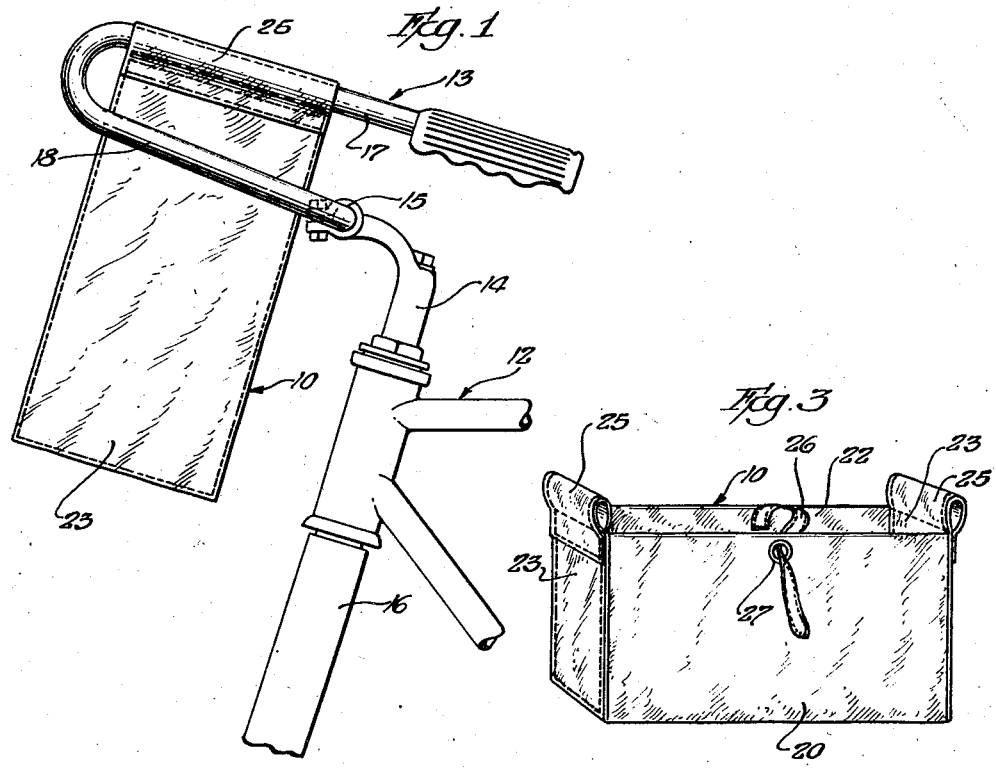
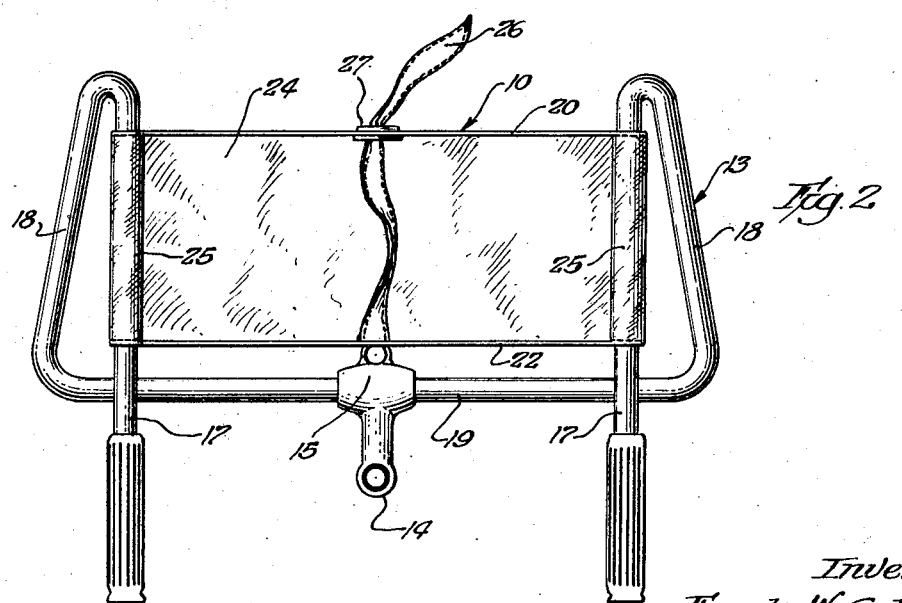
Inventor.
Frank W. Schwinn July 15, 1947.          F. W. SCHWINN          2,424,195
CARRIER ATTACHMENT
Filed April 19, 1945          2 Sheets-Sheet 2

Inventor:
Frank W. Schwinn
By McCaleb, Wendt and Dickinson
Attys.

Patented July 15, 1947

2,424,195

UNITED STATES PATENT OFFICE 2,424,195

CARRIER ATTACHMENT

Frank W. Schwinn, Chicago, Ill.

Application April 19, 1945, Serial No. 589,209

7 Claims. (Cl. 224—36)

This invention relates to carrier attachments adapted to use on bicycles or other forms of cycles and the like for carrying loads such as papers or packages.

A general object of the invention is to provide a light weight carrier attachment which may be easily and quickly put on or detached from a conventional bicycle or the like.

The invention has for a more specific object the provision of a carrier attachment for bicycles and the like which is particularly suited to the carrying and delivery of loads such as newspapers or magazines.

Another object of the present invention is to provide a carrier attachment for bicycles and the like which includes a flexible bag and a coacting rigid support from which the flexible bag is suspended relative to the bicycle.

It is another object of this invention to provide an improved carrier attachment for use on the front end of a bicycle or the like.

Other objects and advantages of the invention will be apparent from the following description and the accompanying drawings, in which similar characters of reference indicate similar parts throughout the several views.

Referring to the drawings;

Fig. 1 is a fragmentary side elevational view depicting the adaptation of a preferred embodiment of my invention to a bicycle;

Fig. 2 is a top plan view of the form of my invention illustrated in Fig. 1;

Fig. 3 is a perspective view of a preferred type of carrying container utilized with the various illustrated forms of my invention;

Figure 4:
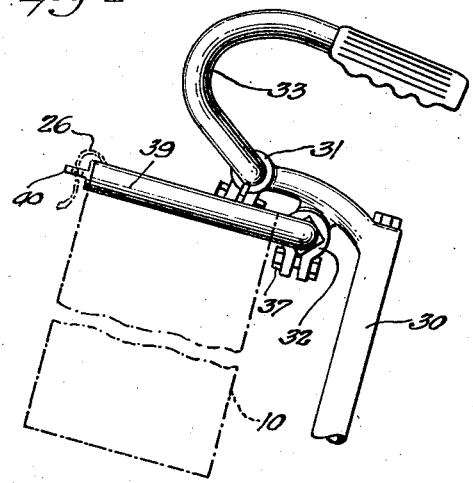
Fig. 4 is a fragmentary side elevational view showing the adaptation of a modified form of my invention to a bicycle.

Referring to the exemplary embodiment of my invention illustrated in Figs. 1, 2, and 3, a carrying container 10 is supported relative to a bicycle indicated fragmentarily at 12 by a handle bar 13, which is specially suited to the purpose. The bicycle with which this preferred carrier attachment is used may be of almost any desired type, and is illustrated as being conventional. As is usual, a handle bar stem 14 has a clamp 15 at its projecting end for holding the handle bar 13, and provides a steering connection to a rotatably supported front fork 16.

In order to accommodate a carrying container of the desired size, such as, for example, one suited to the carrying of newspapers, magazines and the like, the handle bars 13 are of a breadth such that the container may be suspended between substantially parallel grip supporting end portions 17 thereof. In addition, and since it is desirable for the carrying of a large container, the handle bar 13 has forwardly extending side portions 18 of sufficient length to allow space for the container forwardly of the handle bar stem and intermediate connecting portion 19 of the handle bar, which is secured to the stem 14 by the clamp 15.

The carrying container 10 in the present instance desirably comprises a flexible bag of generally rectangular shape and made of a material such as a durable fabric. The bag 10 has front and rear walls 20 and 22, end walls 23, and a bottom 24. At the tops of the end walls 23 integrally formed loops 25 extend across those end walls above the level of the front and rear walls 20 and 22. The loops 25 are of a size such that they slip freely over the grip supporting portions 17 of the handle bar.

It is desirable that the width of the bag from end to end correspond to the lateral distance between the grip supporting portions 17 of the handle bar. With the width of the bag so related to the distance between the supporting portions of the handle bar and the loops extending across the end walls of the bag, it is suspended from the handle bar with its parts in distended relation.

In the disclosed embodiment a strap or tie 26 is secured to the top of the wall 22 and is of sufficient length to extend across the top of the bag and be threaded through an eyelet 27 in the opposite wall. It is understood, of course, that a cover might be secured to the bag in place of the strap and that both the strap and cover might be omitted.

Figure 5:
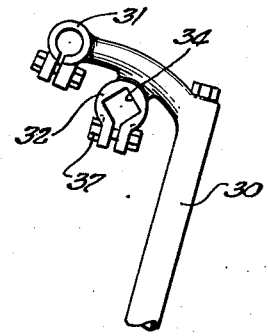
Fig. 5 is a side elevational view of a portion of the structure shown in Fig. 4.
Figure 6:
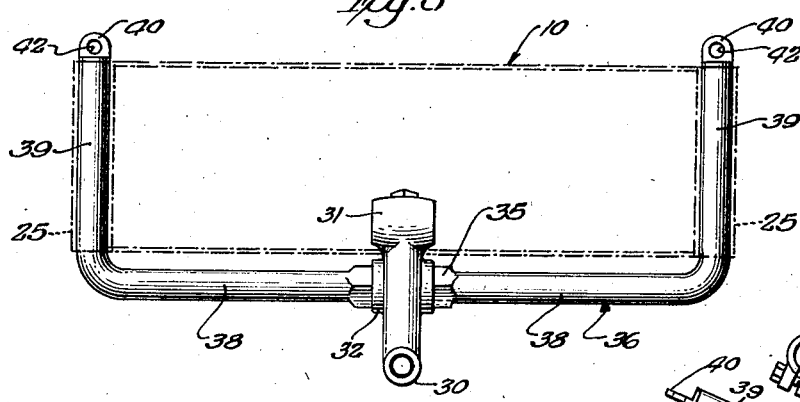
Fig. 6 is a top plan view of a portion of the structure illustrated in Fig. 4.

In the modified form of my invention, illustrated in Figs. 4, 5, and 6, an especially adapted handle bar stem 30 includes, in addition to the usual handle bar clamp 31, an integrally formed carrier support clamp 32 extending downwardly from the forwardly projecting portion of the stem. The handle bar clamp 31 is used in its usual manner to secure to the stem any desired type of handle bar, such as that illustrated at 33.

As shown in Fig. 5, the inner surface 34 of the clamp 32 is desirably rectangular and adapted to fit a rectangularly shaped mid portion 35 of a carrier support bar 36. The carrier support bar 36 is secured in position by the tightening of a bolt 37. Extending laterally from the rectangular mid portion 35 of the support bar 36 are arms 38, the end portions 39 of which are bent to extend forwardly in substantial parallel relation. At the projecting ends 40 the portions 39 of the bar are desirably flattened and transversely drilled as at 42 to accommodate suitable container holding elements when desired.

With the parallel projecting side portions 39 of the support bar 36 extending forwardly in substantially a horizontal direction or slightly sloped downwardly toward their supported ends, the carrying container 10, which is desirably similar to the previously described bag and indicated in dot and dash lines in Figs. 4 and 6, is suspended from the forwardly projecting side portions of the bar. As in the case of the handle bar support for the carrying container, the projecting side portions 39 of the support bar 36 are desirably of a length and properly spaced relative to the dimensions of the container to hold the parts of the container in distended relation.

Figure 8:
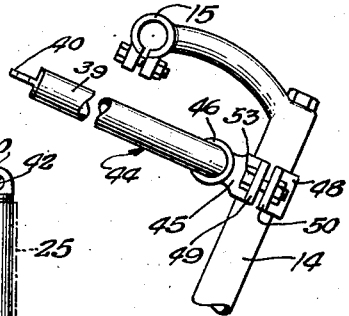
Figs. 7 and 8 are, respectively, top plan and side elevational views illustrating an additional modified form of the present invention.
Figure 7:
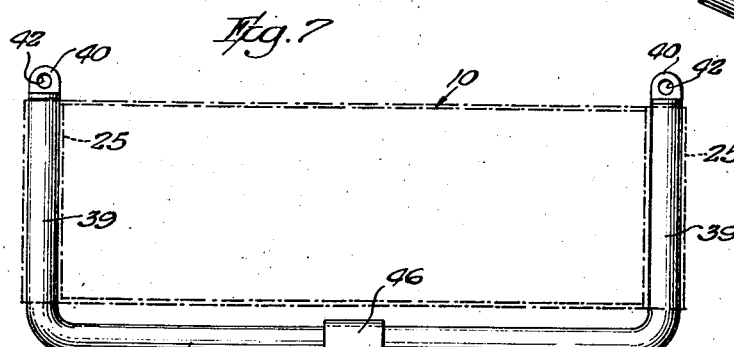

The modified form of my invention, which is illustrated in Figs. 7 and 8, is quite similar to that shown in Figs. 4, 5, and 6, except that a carrier suport bar 44 has a clamp 45 secured to the mid portion thereof, which clamp is adapted to the mounting of the support bar relative to a conventional type of handle bar stem 14, such as that illustrated in Fig. 1. In Figs. 7 and 8 reference numerals similar to those previously used refer to like parts.

The clamp 45 desirably comprises a collar 46 secured to the mid portion of the support bar by suitable means, such as brazing. On the side of the support bar opposite the parallel projecting end portions 39, the clamp includes coacting clamping parts 47 and 48 having integral side wings 49 and 50 for the accommodation of clamping bolts and intermediate curved portions defining a stem-receiving opening 52. With the handle bar stem 14 extending through the stem-receiving opening, the support bar 44 is secured in place by tightening bolts 53, which extend through the wings 49 and 50.

From the foregoing description it may be understood that the various modified forms of my invention provide an easily attachable and detachable carrier for bicycles and the like which is strong, although light in weight. The use of the illustrated fabric carrying container not only contributes to the lightness of weight, but also provides protection and a desirably flexible support for the carrying of relatively fragile articles, such as newspapers, magazines, and groceries.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. A carrier attachment for bicycles and the like including a handle bar stem and comprising, in combination, a fabric bag of generally rectangular shape and having a bottom, front and rear walls, and end walls, loops extending across the tops of said end walls, and means adapted to be fixedly secured to the handle bar stem at the front of the bicycle and having a pair of substantially rigid and parallel bar portions disposed forwardly of said stem and separated laterally of the bicycle by an amount substantially equal to the end-to-end width of said bag, said bar portions being removably extended through said loops to suspend the bag at the front of the bicycle and in front of the handle bar stem with the front, rear and end walls extended.

2. In a carrier attachment for bicycles and the like, having a handle bar stem and a handle bar carried by said stem, the combination comprising a substantially U-shaped and rigid support bar, and clamp means below the handle bar for securing the mid portion of the support bar to said handle bar stem with the ends thereof extending forwardly on opposite sides of the stem.

3. In a carrier attachment for bicycles and the like, having a handle bar stem, the combination comprising a substantially U-shaped and rigid support bar, and clamp means having parts integral with the handle bar stem securing the mid portion of the support bar to said handle bar stem with the ends thereof extending forwardly on opposite sides of the stem.

4. A carrier attachment adapted to be used on a bicycle or the like having a handle bar stem with a handle bar clamp thereon and comprising, in combination, a support element made of tubular material bent to provide oppositely disposed arms extending laterally of the handle bar stem and parallel end portions projecting in a practically horizontal direction transversely to said arms, means displaced from said handle bar clamp for clamping the mid-portion of the support element to the handle bar stem, and a carrying container having support loops at opposite ends thereof through which said end portions of the support element extend to suspend the container in distended relation.

5. A carrier attachment adapted to use on a bicycle or the like having a handle bar stem with a handle bar clamp at the end thereof and comprising, in combination, a support element made of tubular material bent to provide oppositely disposed arms extending laterally of the handle bar stem and substantially parallel end portions projecting in parallel relationship and transversely in said arms, means including parts integral with the handle bar stem and disposed in spaced relationship to said handle bar clamp for clamping said support element to the handle bar stem, and a carrying container having support loops at opposite ends thereof through which said end portions extend to suspend the container in distended relation.

6. A carrier attachment adapted to use on a bicycle or the like having a handle bar stem and comprising, in combination, a handle bar having lateral arms projecting from the handle bar stem and integrally formed grip carrying end portions extending in substantially parallel relation from positions forwardly of said arms and handle bar stem, and a fabric bag having loops at opposite ends of the top adapted slidably to fit over said grip carrying end portions of the handle bar to positions forwardly of said arms to suspend said bag ahead of the handle bar stem.

7. A carrier attachment adapted to use on a bicycle or the like having a handle bar stem and comprising, in combination, a substantially U-shaped carrier support bar having extending end portions, clamp means securing said support bar to the handle bar stem with said end portions projecting forwardly on opposite sides of said stem, and a carrying container suspended distendedly from said end portions of the support bar.

FRANK W. SCHWINN.

REFERENCES CITED

The following references are of record in the file of this patent:

UNITED STATES PATENTS

| Number | Name | Date |
|---|---|---|
| 479,846 | Sager | Aug. 2, 1892 |
| 481,890 | Blood | Aug. 30, 1892 |
| 467,729 | Wall | Jan. 26, 1892 |
| 1,862,384 | Millar | June 7, 1932 |
| 1,844,872 | Shipman | Feb. 9, 1932 |
| 1,189,860 | Apple | July 4, 1916 |

FOREIGN PATENTS

| Number | Country | Date |
|---|---|---|
| 600,560 | France | Nov. 10, 1925 |
| 354,860 | France | Aug. 9, 1905 |